(12) United States Patent
Okamoto et al.

(10) Patent No.: US 7,505,165 B2
(45) Date of Patent: Mar. 17, 2009

(54) IMAGE RECORDING APPARATUS

(75) Inventors: Masayoshi Okamoto, Osaka (JP); Shigeaki Yamamoto, Hyogo (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 1019 days.

(21) Appl. No.: 10/144,859

(22) Filed: May 15, 2002

(65) Prior Publication Data
US 2002/0176005 A1 Nov. 28, 2002

(30) Foreign Application Priority Data
May 18, 2001 (JP) .............................. 2001-148861

(51) Int. Cl.
*G06F 15/00* (2006.01)
*G06K 1/00* (2006.01)
*H04H 1/00* (2006.01)

(52) U.S. Cl. ...................... 358/1.16; 711/161; 711/163; 711/164; 711/150; 711/151; 711/152; 711/154; 358/1.15; 358/1.14

(58) Field of Classification Search ................ 358/1.14, 358/1.15, 1.16; 711/161, 154
See application file for complete search history.

(56) References Cited

U.S. PATENT DOCUMENTS

| | | | | |
|---|---|---|---|---|
| 4,939,689 A * | 7/1990 | Davis et al. | ................... | 707/102 |
| 5,539,891 A * | 7/1996 | Childers et al. | ................ | 711/5 |
| 5,550,997 A * | 8/1996 | Ip et al. | ....................... | 711/103 |
| 5,860,136 A * | 1/1999 | Fenner | ........................ | 711/201 |
| 6,189,016 B1 * | 2/2001 | Cabrera et al. | .............. | 707/203 |
| 6,253,214 B1 * | 6/2001 | Hall et al. | .................... | 707/204 |
| 6,292,880 B1 * | 9/2001 | Mattis et al. | ................. | 711/216 |
| 6,452,630 B1 * | 9/2002 | Haruki | ..................... | 348/231.6 |
| 6,615,224 B1 * | 9/2003 | Davis | ......................... | 707/202 |
| 6,629,203 B1 * | 9/2003 | Humlicek | ................... | 711/114 |

(Continued)

FOREIGN PATENT DOCUMENTS

JP 02-021326 1/1990

(Continued)

OTHER PUBLICATIONS

Computer Translation of Japanese publication JP 2002182957 A.*

(Continued)

*Primary Examiner*—David K Moore
*Assistant Examiner*—Benjamin O Dulaney
(74) *Attorney, Agent, or Firm*—Westerman, Hattori, Daniels & Adrian, LLP.

(57) ABSTRACT

An image recording apparatus includes a CPU. An image file created by the CPU is stored in a directory which is created on a hard disk and a circularly successive directory number is assigned to. When the number of image files accumulated in a latest directory reaches "450", the CPU determines a total number of the directories, and if the total number reaches "50", the CPU erases an oldest directory. Furthermore, when the number of the image files accumulated in the latest directory reaches "900", the CPU creates a new directory to which the directory number succeeding to that of the latest directory is assigned. In addition, when an arbitrary directory is erased by an operation of an erasing key, the CPU assigns the successive directory number to a remaining directory in order of a creation time.

15 Claims, 13 Drawing Sheets

U.S. PATENT DOCUMENTS

| | | | |
|---|---|---|---|
| 6,686,965 B1 * | 2/2004 | Fujii | 348/333.02 |
| 6,765,612 B1 * | 7/2004 | Anderson et al. | 348/231.2 |
| 6,771,889 B1 * | 8/2004 | Suga et al. | 386/95 |
| 6,920,466 B2 * | 7/2005 | Kudo | 707/200 |
| 6,954,229 B1 * | 10/2005 | Otala | 348/231.99 |
| 6,954,280 B1 * | 10/2005 | Kaibara | 358/1.15 |
| 7,059,721 B2 * | 6/2006 | Hayashi et al. | 351/206 |
| 7,139,095 B1 * | 11/2006 | Hunter | 358/1.18 |
| 2001/0038417 A1 * | 11/2001 | Uehara et al. | 348/333.12 |
| 2001/0043344 A1 * | 11/2001 | Imai et al. | 358/1.9 |
| 2002/0049726 A1 * | 4/2002 | Cork et al. | 707/1 |
| 2002/0051065 A1 * | 5/2002 | Takahashi | 348/232 |
| 2002/0051641 A1 * | 5/2002 | Nagaoka | 396/429 |
| 2002/0149676 A1 * | 10/2002 | Hatori | 348/207.1 |
| 2003/0043282 A1 * | 3/2003 | Malloy Desormeaux | 348/231.3 |

FOREIGN PATENT DOCUMENTS

| | | |
|---|---|---|
| JP | 03-259329 | 11/1991 |
| JP | 06-242999 | 9/1994 |
| JP | 06-348573 | 12/1994 |
| JP | 09-054676 | 2/1997 |
| JP | 2000-236503 | 8/2000 |
| JP | 2002182957 A * | 6/2002 |

OTHER PUBLICATIONS

Robert Sedgwick, Algorithm C (First Version), Kindai Kagaku Sha Co., Ltd., Japan, Pct. 10, 1990, pp. 108-109 (partial translations, p. 108, lines 4-14).

* cited by examiner

| | | |
|---|---|---|
| P1 | 101IM00 | 2001/4/29 18:07:28 |
| P2 | 103IM00 | 2001/4/29 18:17:28 |
| P3 | : | : |
| : | 148IM00 | 2001/4/29 22:02:28 |
| P48 | 149IM00 | 2001/4/30 08:25:12 |
| P49 | 150IM00 | 2001/4/29 18:02:28 |

28b ... T2

(B)

| | | |
|---|---|---|
| P1 | 101IM01 | 2001/4/29 18:07:28 |
| P2 | 103IM01 | 2001/4/29 18:17:28 |
| P3 | : | : |
| : | 148IM01 | 2001/4/29 22:02:28 |
| P48 | 149IM01 | 2001/4/30 08:25:12 |
| P49 | 150IM01 | 2001/4/29 18:02:28 |

28b ... T2

(C)

| | | |
|---|---|---|
| P1 | 102IM00 | 2001/4/29 18:07:28 |
| P2 | 103IM00 | 2001/4/29 18:17:28 |
| P3 | : | : |
| : | 148IM00 | 2001/4/29 22:02:28 |
| P48 | 149IM00 | 2001/4/30 08:25:12 |
| P49 | 101IM00 | 2001/4/29 18:02:28 |

28b ... T2

IMAGE RECORDING APPARATUS

BACKGROUND OF THE INVENTION

1. Field of the Invention

The present invention relates to an image recording apparatus applied to a digital camera, for example. More specifically, the present invention relates to an image recording apparatus storing an image signal in a directory having any one of circularly successive predetermined number of identification numbers.

2. Description of the Prior Art

It is appropriate that image files are scattered to a plurality of directories in order to efficiently manage a vast number of image signals recorded on a recording medium. If time information and a circularly successive directory number are assigned to the directory at a time of creating the directory, a latest directory can be specified on the basis of the time information and an oldest directory is specified by the directory number. Furthermore, in a case the directory number has limitations in number, if the oldest directory is erased at a time the directory number is used up, it is possible to reserve the directory number to be assigned to a new directory. Thus, it is possible to hold a new image signal on the recording medium by priority with efficiently utilizing the directory number limited in number.

However, in a case an arbitrary directory is erased, unless the directory is the oldest directory, it is impossible to utilize a directory number lacked by the erasure. This is because when the lacked directory number is assigned to the new directory, the directory number is not successive in order of creating the directory, and therefore, it is difficult to manage the image signal. Accordingly, even if room for assigning the directory number is obtained by erasing the arbitrary directory, the oldest directory has to be erased at a time of creating the novel directory, and therefore, efficiency of using the directory number decreases.

SUMMARY OF THE INVENTION

Therefore, it is a primary object of the present invention to provide a novel image recording apparatus.

Another object of the present invention is to provide an image recording apparatus capable of effectively utilizing a directory number.

According to the present invention, an image recording apparatus which stores an image signal into a directory to which a circularly successive identification number is assigned comprises a first eraser for erasing an oldest directory when a first condition is satisfied; a creator for creating a new directory to which an identification number succeeding to the identification number of a latest directory is assigned when a second condition is satisfied; a second eraser for erasing an arbitrary directory; a remaining directory detector for detecting a remaining directory when an erasure is performed by the second eraser; and a assigner for assigning the successive identification number to the remaining directory in order of the creation time.

The image signal is stored in the directory to which the circularly successive identification number is assigned. When the first condition is satisfied, the oldest directory is erased by the first eraser. When the second condition is satisfied, the new directory to which the directory number succeeding to that of the latest directory is created by the creator. When an arbitrary directory is erased by the second eraser, the remaining directory is detected by the remaining directory detector. The assigner assigns the successive identification number to the remaining directory in order of the creation time. Thus, the identification number of the remaining directory is modified. When the second condition is satisfied after modifying the identification number, a new directory to which an identification number succeeding to the identification number assigned to the remaining directory is assigned is created. Thus, when an arbitrary directory is erased, the successive identification number is assigned to the remaining directory in order of the creation time, and therefore, it is possible to efficiently utilize the identification number.

In a case the assignable identification number exists in a predetermined number, if the first condition includes a condition that a first total number of directories is the predetermined number, it is possible to utilize the identification number most efficiently.

In a case a second total number of the image signals accumulated in a noted directory is detected by a second detector, if the first condition includes a condition that the second total number reaches a first threshold value, and the second condition includes a condition that the second total number reaches a second threshold value larger than the first threshold value, it is possible to prevent the same identification number from being redundantly assigned to a plurality of directories.

In a case each directory has creation time information, preferably, an assignment of the identification number is performed on the basis of the creation time information.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 11(A) is an illustrative view showing one example of a second directory list;

FIG. 11(B) is an illustrative view showing another example of the second directory list;

FIG. 11(C) is an illustrative view showing the other example of the second directory list;

DETAILED DESCRIPTION OF THE PREFERRED EMBODIMENTS

Figure 1:
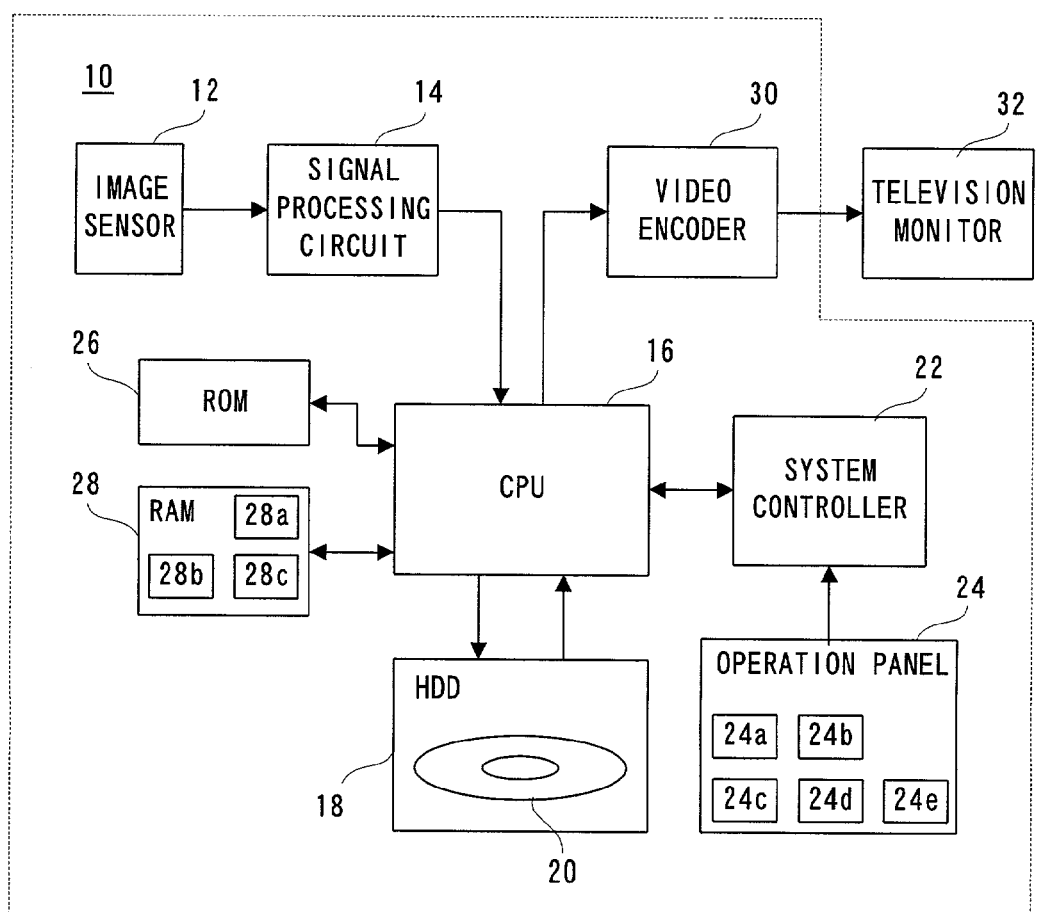
FIG. 1 is a block diagram showing one embodiment of the present invention.

Referring to FIG. 1, a surveillance camera 10 of this embodiment is fixed at a surveillance position. When a recording key 24a provided on an operation panel 24 is operated, a corresponding state signal is applied from a system controller 22 to a CPU 16. The CPU 16 determines that a recording start operation is performed and creates a first directory list 28a so as to perform a photographing/recording process on the basis of the created first directory list 28a.

Figure 2:
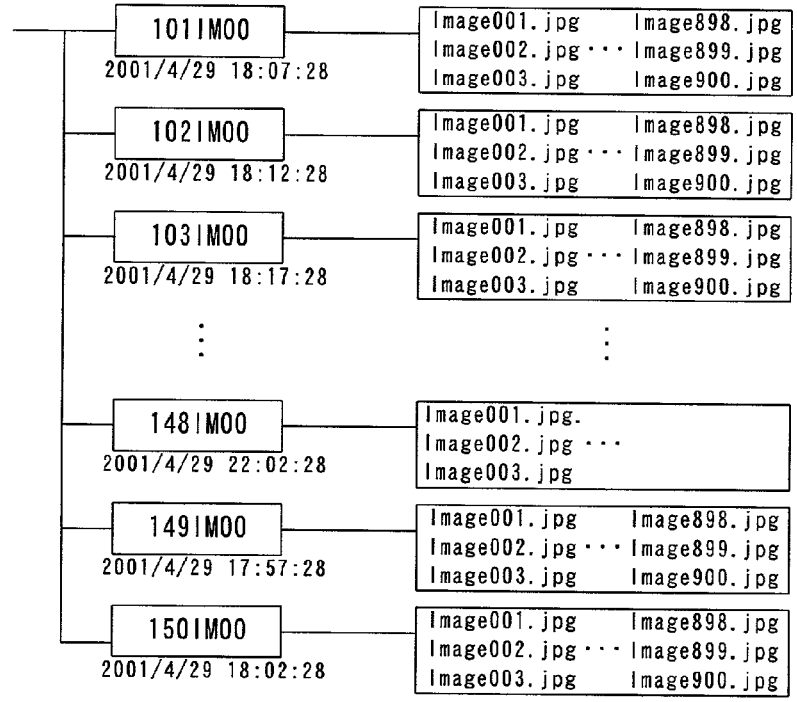
FIG. 2 is an illustrative view showing one example of a directory configuration.

The hard disk 20 has a directory configuration shown in FIG. 2, for example. According to FIG. 2, a total of 50 directories each of which has a directory name "* * * IM00" (* * *: circularly renewed directory number having 101 to 150) is formed. A total of 900 image files each of which has a file name "Image XXX.jpg"(XXX: file number of 001~900) is stored in each directory. Time information (time stamp) indicated by a clock 28c stored in a RAM 28 is assigned to either the directory or the image file at a time of creating. It is apparent from the assignment of the time information that the directory "101IM00" is created at 2001/4/29 18:07:28 and the directory "102IM00" is created at 2001/4/29 18:12:28.

Figure 8:
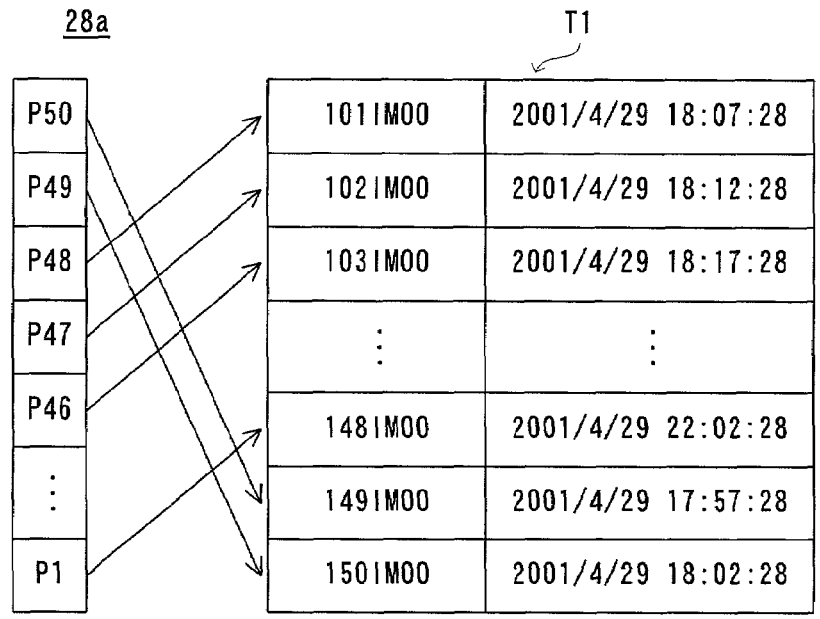
FIG. 8 is an illustrative view showing one example of a first directory list.

When the recording of 2001/4/29 is completed before the directory "148IM00" becomes full, and the above-described recording start operation is performed at around 8:00 a.m. in the next morning, the first directory list 28a shown in FIG. 8 is created by the CPU16. First, the directory name and the time information of each directory are detected from the hard disk 20 and the detected directory name and time information are registered in a table T1 in ascending order of the directory number. Subsequently, a plurality of pointers P1~P50 are respectively assigned to the directory names in descending order of the directory number with a directory name having a latest time information as a starting point.

According to FIG. 8, each directory name is set in the table T1 in order of "101IM00"→"102IM00"→ . . . and each time information is associated with each directory. Furthermore, since "148IM00" has the latest time information, the pointers P1, P2, P3 . . . are respectively assigned to the directory names with "148IM00" as the starting point in order of "148IM00"→"147IM00"→"146IM00" . . . . Since the directory number is circular from "101" to "150", after the pointer P48 is assigned to "101IM00", the pointer P49 is assigned to "150IM00". As a result, the pointers P1 to P50 respectively point out the directory names in the order of creating the directory. That is, the larger the number assigned to the pointer (pointer number) is, the older a creation time of the directory pointed by each pointer becomes.

After completion of creating the first directory list 28a, the CPU 16 drives an image sensor 12 at a frame rate of 3 fps. The image sensor 12 outputs an image signal at a ratio of 3 frames per second. A signal processing circuit 14 performs color separation, white balance adjustment, YUV conversion and etc. on the outputted image signal, and applies the processed image signal to the CPU 16. The CPU 16 compresses the image signal applied from the signal processing circuit 14 by a JPEG format so as to create an image file including a compressed thumbnail image signal and a compressed primary image signal and stores the created image file in the latest directory through an HDD (Hard Disc Drive) 18. The image file is stored in the latest directory "148IM00" pointed by the pointer P1.

Figure 3:
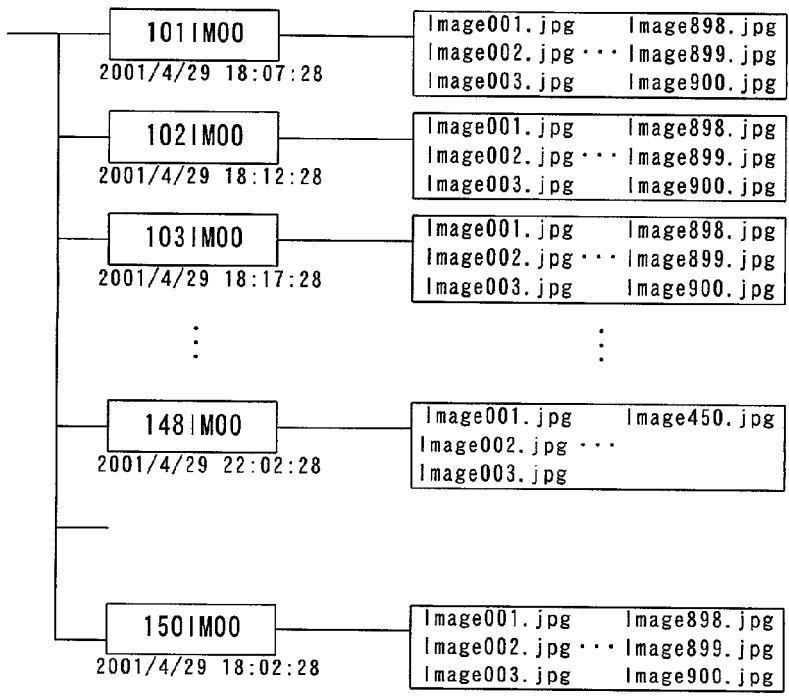
FIG. 3 is an illustrative view showing another example of the directory configuration.

When 450 of image files are reserved in the latest directory, the CPU 16 erases an oldest directory from the hard disk 20. Since the directory number is circularly successive, the oldest directory is "149IM00" having the directory number succeeding to that of the latest directory "148IM00". Accordingly, at a time the 450 of image files are stored in "148IM00", "149IM00" is erased as shown in FIG. 3. It is noted that as the erasure of the directory, image files of the lower level of the directory are also erased.

Figure 4:
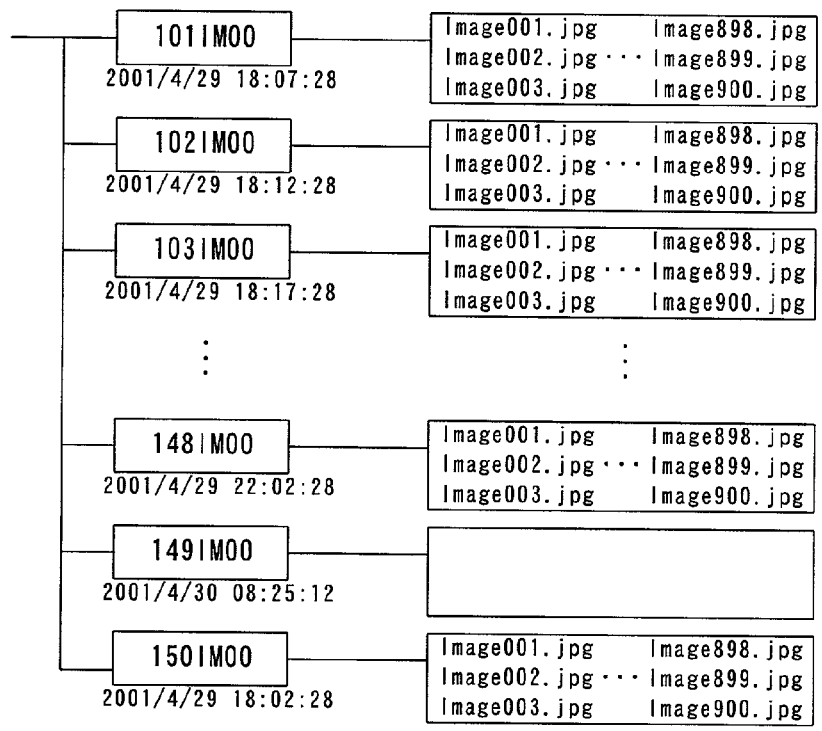
FIG. 4 is an illustrative view showing the other example of the directory configuration.

When 900 of image files are reserved in the latest directory, the directory becomes full. The CPU 16 newly creates a directory having a directory number succeeding to that of the directory which becomes full, and assigns the time information indicated by the clock 28c to the created new directory. Thus, the new directory becomes the latest directory. The CPU 16 stores an image file obtained after creating the new directory in the new directory. Referring to FIG. 4, when "148IM00" becomes full, "149IM00" is newly created, and the time information indicative of a current time (2001/4/30 8:25:12) is assigned thereto. Image files obtained thereafter is stored in "149IM00".

Figure 5:
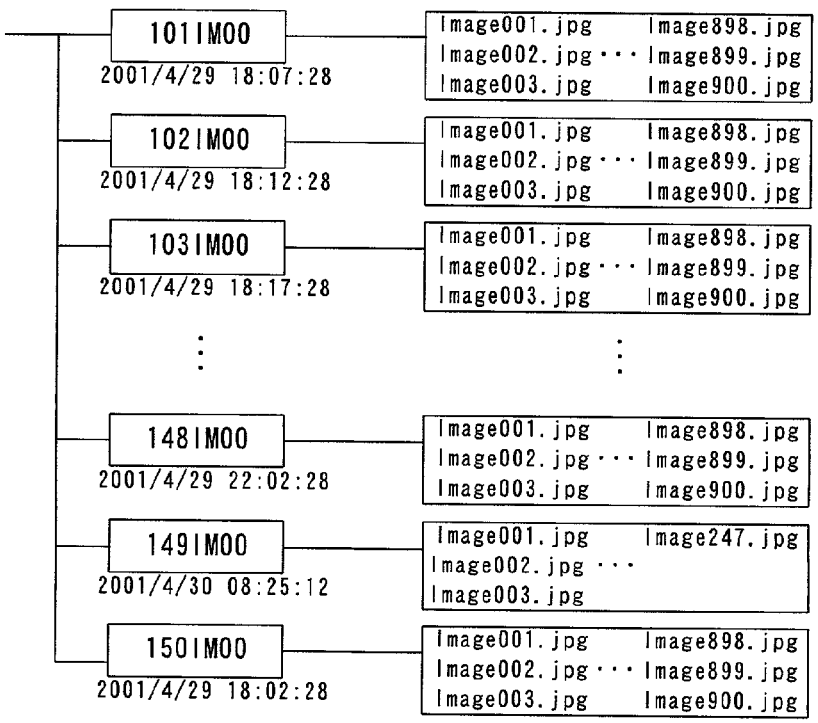
FIG. 5 is an illustrative view showing a further example of the directory configuration.

When the completion key 24c on the operation panel 24 is pressed at a time the number of image files stored in "149IM00" reaches "247", a corresponding state signal is applied from the system controller 22 to the CPU 16. The CPU 16 determines that a recording completion operation is performed and disables the image sensor 12 so as to stop a storing process of the image file. Herein, the hard disk 20 takes a directory configuration shown in FIG. 5.

When a reproducing key 24b on the operation panel 24 is pressed, the system controller 22 applies a corresponding state signal to the CPU 16. The CPU 16 determines that a reproducing start operation is performed and creates the first directory list 28a in the same manner as an occasion of recording. The CPU 16 specifies 9 directories pointed out by the pointers P1 to P9, and reads out the compressed thumbnail image signal from a top image file (Image 001.jpg) stored in each of the specified 9 directories. The CPU 16 furthermore expands the read 9 compressed thumbnail image signals by the JPEG format and applies 9 thumbnail image signals thus expanded to a video encoder 30. The video encoder 30 encodes the applied 9 thumbnail image signals so as to generate a composite image signal and outputs the generated composite image signal to a television monitor 32.

Figure 10:
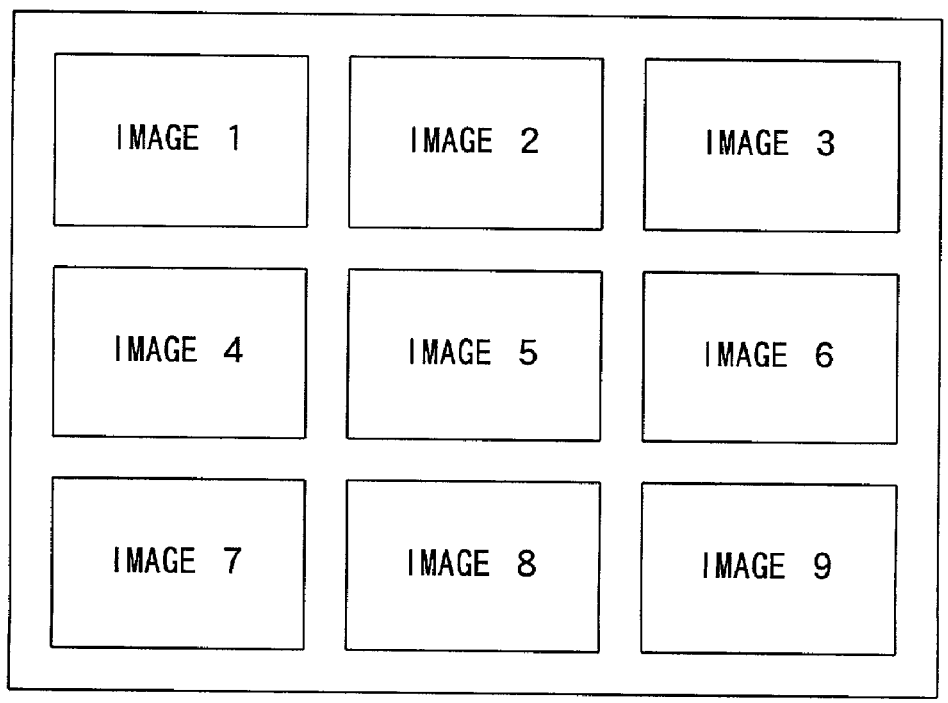
FIG. 10 is an illustrative view showing thumbnail images multi-displayed on a television monitor.
Figure 12:
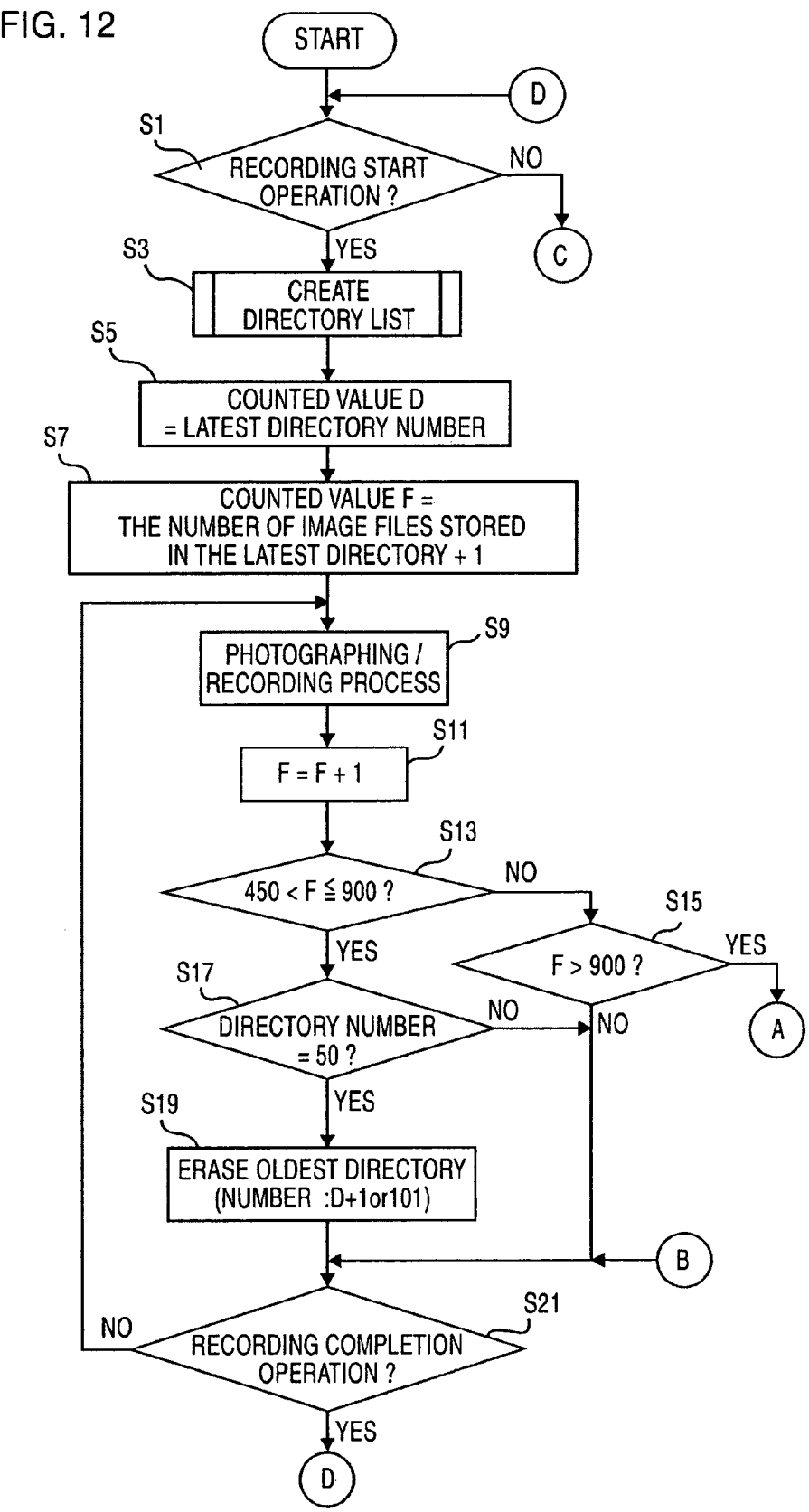
FIG. 12 is a flowchart showing a part of an operation of FIG. 1 embodiment.
Figure 13:
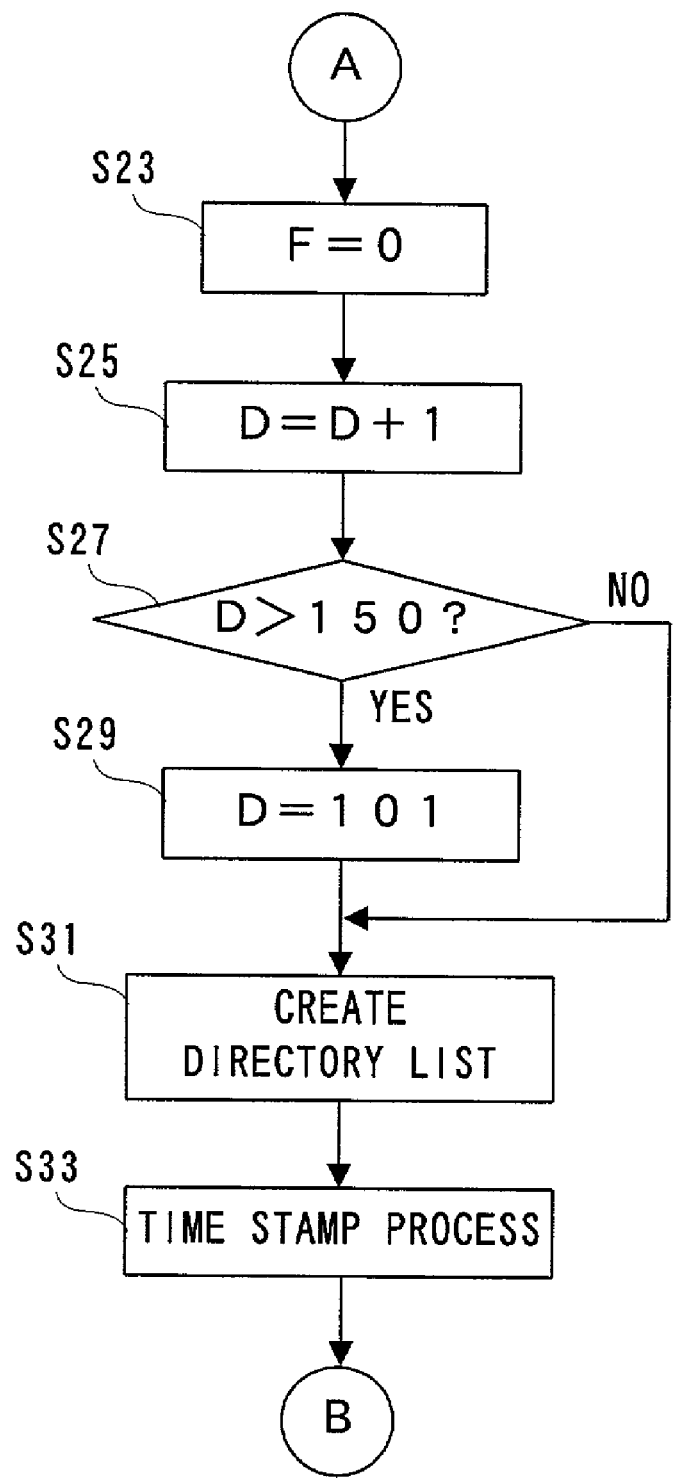
FIG. 13 is a flowchart showing another part of the operation of FIG. 1 embodiment.

Therefore, 9 thumbnail images are multi-displayed on the monitor screen as shown in FIG. 10. Respective thumbnail images 1 to 9 displayed are images representative of readingout source directories and arranged on the monitor screen in order of the pointers P1 to P9. It is noted that representative images of the directories pointed out by the pointer having the pointer number more than "10" are displayed on the monitor screen by operating a predetermined key.

Herein, when an arbitrary thumbnail image is selected by a cursor key 24d and the reproducing key 24b is operated, the CPU 16 determines that a reproducing directory selecting operation is performed, accesses the directory corresponding to the selected thumbnail image and reads out the compressed primary image signal from each image file stored in the access destination directory. The reading-out is performed every ⅓ second in order of the file number, and the read compressed primary image signal is expanded in the JPEG format. The expanded primary image signal is applied to the television monitor 32 via the video encoder 30 and whereby, a motion image reproduced at a normal speed is displayed on the monitor screen. It is noted that the television monitor 32 is a separate body from the surveillance camera 10 and disposed at a distant place (e.g., security guards room).

Figure 6:
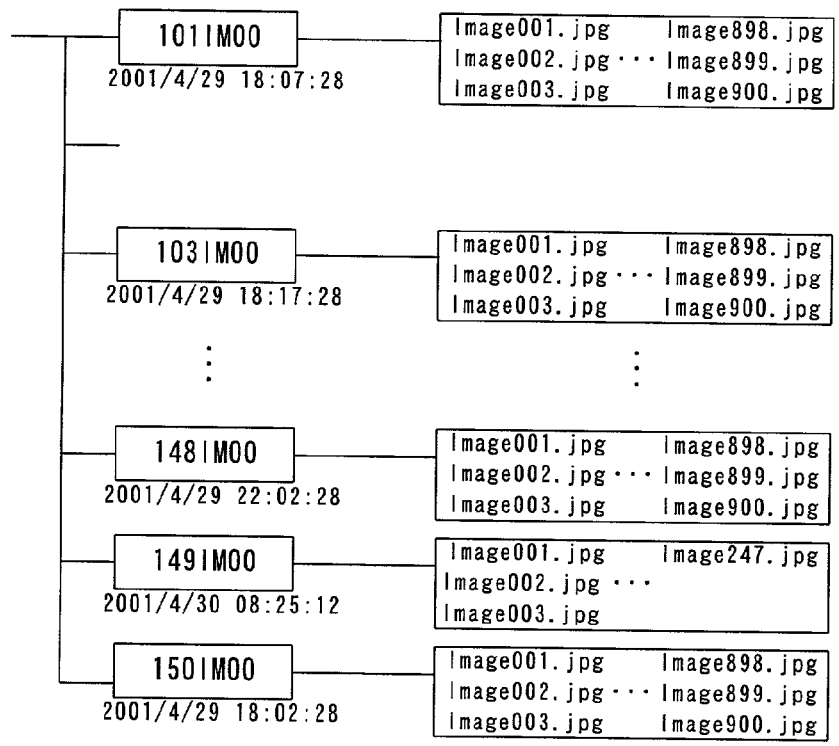
FIG. 6 is an illustrative view showing another example of the directory configuration.

When an arbitrary thumbnail image is selected by the cursor key 24d and an erasing key 24e is operated, the CPU 16 determines that a erasing directory selecting operation is performed and erases the directory corresponding to the selected thumbnail image from the hard disk 20. When the erasing key 24e is pressed in a state the thumbnail image representative of "102IM00" is selected, "102IM00" is erased. Herein, the hard disk 20 takes a directory configuration shown in FIG. 6.

After completion of erasing the arbitrary directory, the CPU 16 creates a second directory list 28b shown in FIG. 11(A) in the RAM 28 so as to modify the directory number of the directory remaining in the hard disk 20. The CPU 16 first detects the directory name and the time information of the remaining directory from the hard disk 20 and registers the detected directory name and time information in ascending order of the directory number in a table T2. Succeedingly, the CPU 16 assigns pointers to respective directories with the directory name having the oldest time information as the starting point. The number added to the pointer (pointer number) ascends in accordance with ascension of the directory number.

In the above-described operation, since "102IM00" is erased, "101IM00" and "103IM00" to "150IM00" are registered in the table T2. Succeedingly, the pointer P1 is assigned to "150IM00" of the directory name of the oldest directory, the pointer P2 is assigned to "101IM00", and the pointers P3 to P49 are respectively assigned to "103IM00"~"149IM00".

Succeedingly, the CPU 16 adds markers to the directory names registered in the table T2 and the directory names recorded on the hard disk 20. More specifically, "0" existing in the lowest digit of the directory name is modified to "1". The directory names registered in the table T2 are changed from "* * * IM00" to "* * * IM01" as shown in FIG. 11(B), and the directory names recorded on the hard disk 20 are similarly changed. The reason why the maker is thus added is for avoiding an occasion existing a plurality of directory names having the same name by modifying the directory number.

Figure 7:
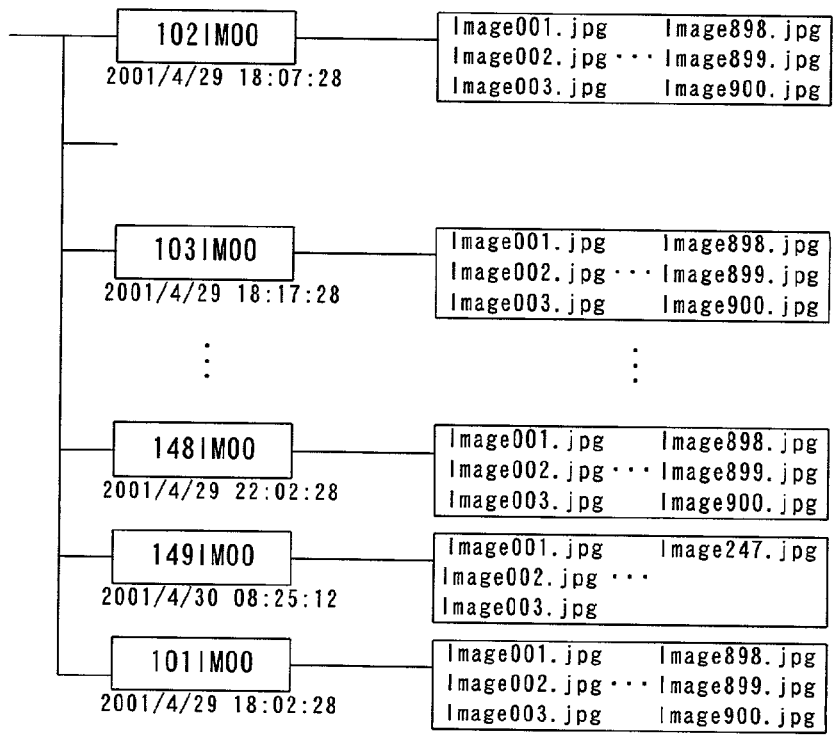
FIG. 7 is an illustrative view showing the other example of the directory configuration.

After completion of an adding process of the marker, the CPU 16 assigns new directory numbers to the directory names registered on the table T2 and the directory names recorded on the hard disk 20. More specifically, the directory numbers starting from "101" are respectively assigned to the directory names in ascending order of the pointer number with the directory name pointed by the pointer P1 as a starting point. Furthermore, at every time one new directory number is assigned, the marker is erased from the assignment destination directory name. Thus, the contents of the second directory list 28b are renewed from FIG. 11(B) to FIG. 11(C). That is, "150IM01" is modified to "101IM00", and "101IM01" is modified to "102IM00". Furthermore, "103IM01" to "149IM01" are modified to "103IM00" to "149IM00", respectively. Thus, the lower two digits of the pointer number and the directory number are coincident with each other between the linked pointer and the directory. At a time of completion of such a modification process of the directory number, the hard disk 20 takes a directory configuration shown in FIG. 7.

Figure 9:
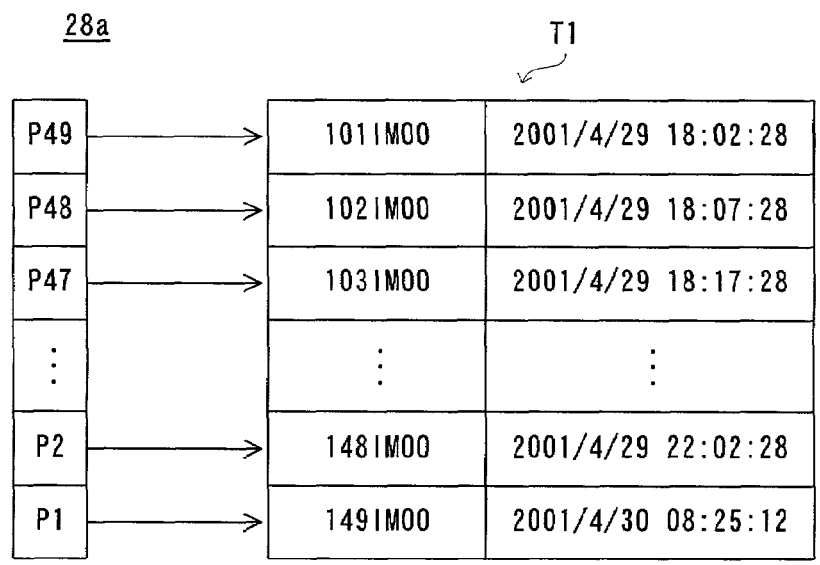
FIG. 9 is an illustrative view showing another example of the first directory list.

When the recording start operation is performed again after the directory number is modified, the first directory list 28a shown in FIG. 9 is created, and "149IM00" is specified as the latest directory. The image file created every ⅓ second is accumulated in the "149IM00". Furthermore, since a total number of the directories existing in the hard disk 20 at this time is less than "50" at this time, even if the number of image files accumulated in "149IM00" reaches "450", the oldest directory of "101IM00" is not erased. When the "149IM00" becomes full, "150IM00" having a successive directory number is newly created.

The CPU 16 specifically processes flowcharts shown in FIG. 12 to FIG. 18 according to a program stored in a ROM 26. First, it is determined whether or not a recording start operation is performed in a step S1. When a recording key 24a is pressed, "YES" is determined, and the first directory list 28a is created in a following step S3. The directory number of the latest directory pointed by the pointer P1 is set as a counted value D in a step S5. In a step S7, the number of image files stored in the latest directory is detected, and the number of the image files+1 is set as a counted value F.

After completion of the setting of the counted values D and F, a photographing/recording process is performed in a step S9. That is, the image sensor 12 is driven, an image signal of an object photographed by the image sensor 12 is subjected to JPEG compression, and an image file including a compressed thumbnail image signal and a compressed primary image signal is stored in the latest directory through the HDD 18. The counted value F is incremented in a step S11, and the incremented counted value F is determined in following steps S13 and S15.

Where a condition of F≦450 is satisfied, it is determined that the number of image files stored in the latest directory is less than "450", and the process directly proceeds to a step S21. It is determined whether or not the completion key 24c is operated (recording completion operation is performed) in the step S21, and if "NO" is determined, the processes after the step S9 are repeated, however; if "YES" is determined, the process returns to the step S1. It is noted that when the recording completion operation is not performed, the processes after the step S9 are executed every ⅓ second and therefore, an image file obtained at a frame rate of 3 fps is accumulated in the latest directory.

Where a condition of 450<F≦900 is satisfied, it is determined that the image files of 450 to 899 are reserved in the latest directory, and the number of directories created on the hard disk 20 is determined in a step S17. If the number of directories are less than "50", it is determined there is a space to create further directories, and the process directly proceeds to the step S21. On the other hand, if the number of directories is equal to "50", it is determined the new directory cannot be created without erasing an existing directory, the oldest directory is erased in a step S19 and then, the process proceeds to the step S21.

Since the directory number of the latest directory is "D", and the directory number is circular, the directory number of the oldest directory is "D+1" or "101" (when D>150). Accordingly, the directory having such the directory number is erased in the step S19.

Where a condition of F>900 is satisfied, it is determined that the number of image files stored in the latest directory reaches "900", and the process proceeds to steps after a step S23 so as to create a new directory. First, the counted value F is returned to "0" in the step S23, the counted value D is incremented in a step S25, and the counted value D is compared with "150" in a step S27. Herein, where a condition of D≦150 is satisfied, the directory number of the directory to be created is determined to be below "150", and the process directly proceeds to a step S31. On the contrary, where a condition of D>150 is satisfied, the directory number of the directory to be created is determined to be "101", the counted value D is set to "101" in a sep S29, and then, the process proceeds to the step S31.

The directory having a directory number of the counted value D is created on the hard disk 20 through the HDD 18 in the step S31. For example, where the counted value D is "145", a new directory having the directory name of "145IM00" is created, and where the counted value D is "101", a new directory having the directory name of "101IM00" is created. In a following step S33, the current time is detected referring to the clock 28*c*, and the detected time information is assigned to the new directory. After completion of the time stamp process, the process shifts to the step S21. The new directory created in the step S31 becomes the latest directory, and the image file obtained by the photographing/recording process after the next time is accumulated in the new directory.

Figure 14:
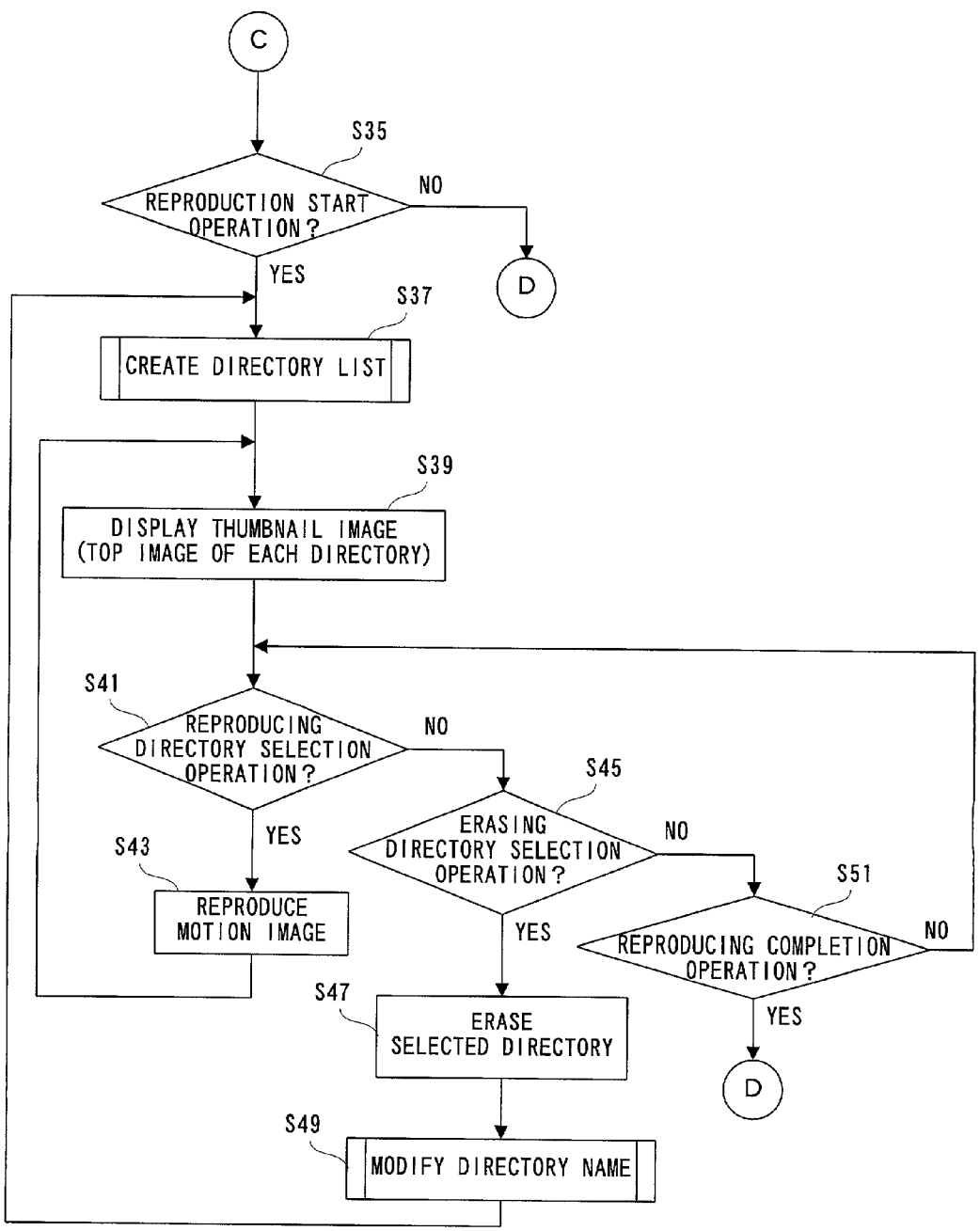
FIG. 14 is a flowchart showing the other part of the operation of FIG. 1 embodiment.

When the reproducing key 24*b* on the operation panel 24 is operated, it is determined a reproducing start operation is performed in a step S35 shown in FIG. 14, and the first directory list 28*a* is created in a step S37. In a step S39, the 9 directories pointed by the pointers P1 to P9 in the first directory list 28*a* are accessed, the compressed thumbnail image signal is read out from the top image file of each directory, and the thumbnail image signal based on the read compressed thumbnail image signal is applied to the video encoder 30. Thus, the 9 thumbnail images are multi-displayed on the television monitor 32 in order of pointing by the pointers P1 to P9.

It is determined whether or not a reproducing directory selecting operation is performed in a step S41, and if "YES" is determined, the process proceeds to a step S43. In the step S43, a directory corresponding to the selected thumbnail image is accessed, the compressed primary image signal is read out from each image file stored in the access destination directory, and the primary image signal based on the read compressed primary image signal is applied to the video encoder 30. The reading-out is performed in the order of the file number every ⅓ second and thus, a motion image is displayed on the television monitor 32. After completion of motion image reproduction from the access destination directory, the process returns to the step S39.

It is determined whether or not an erasing directory selecting operation is performed in a step S45, and if "YES" is determined, the process proceeds to a step S47. In the step S47, the selected directory is detected from the hard disk 20, and the detected directory is erased. After completion of erasing the directory, the directory name is modified in a step S49 and then, the process returns to the step S37. It is determined whether or not the reproducing completion operation (operation of the completion key 24*c*) is performed in a step S51 and if "YES" is determined, the process returns to the step S1.

Figure 15:
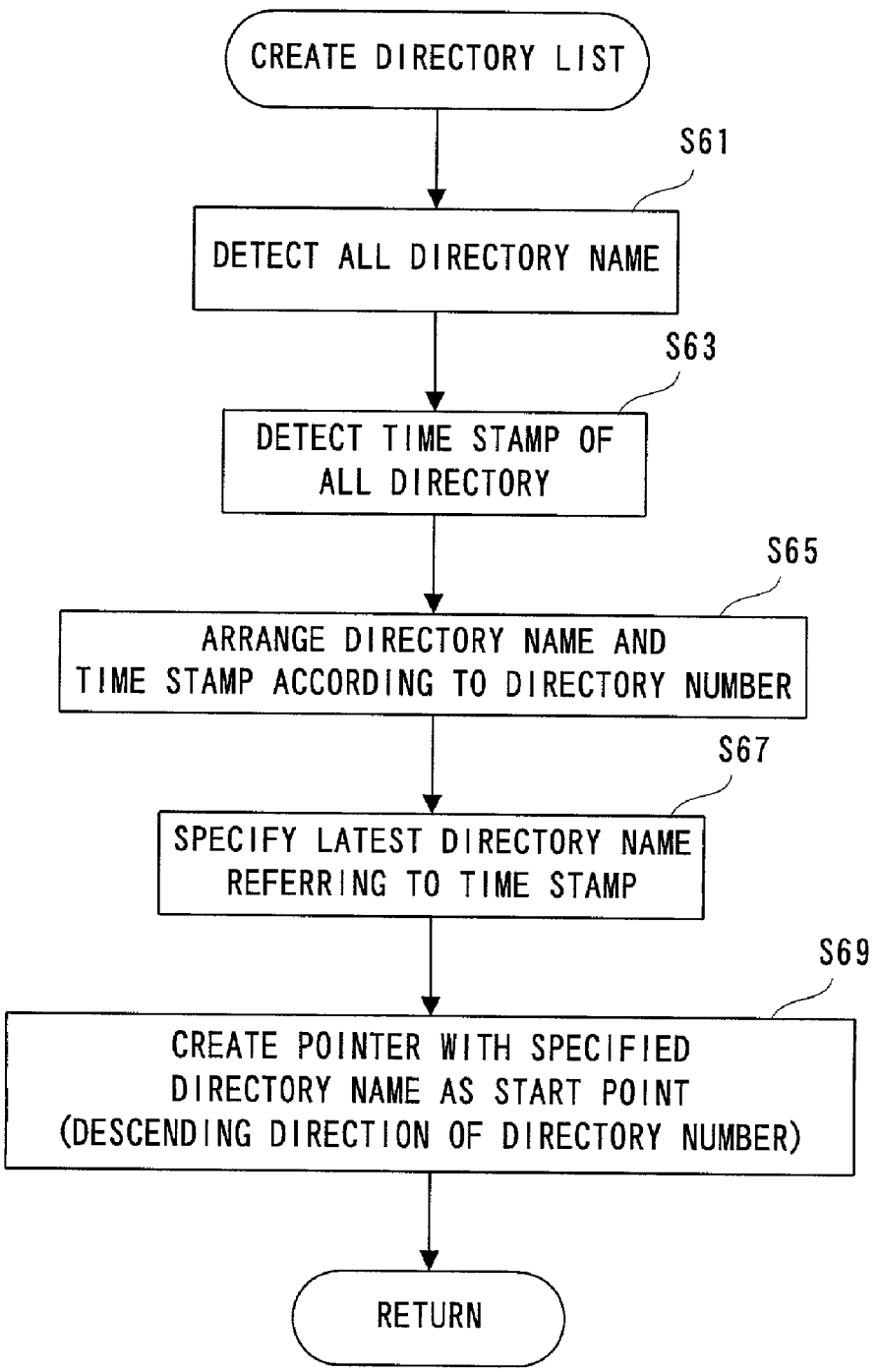
FIG. 15 is a flowchart showing a further part of the operation of FIG. 1 embodiment.

A directory list creating process shown in a step S3 or a step S37 complies with a subroutine shown in FIG. 15. First, the directory names and the time information of all directories are detected from the hard disk 20 in steps S61 and S63, respectively, and the directory names and the time information are arranged in the order of the directory number in a step S65. Thus, the table T1 shown in FIG. 8 or FIG. 9 is created. The directory name of the latest directory is specified referring to the time information in a step S67. In a following step S69 the pointers P1 to P50 are respectively assigned to the directory names with the specified directory name as the starting point in a descending direction of the directory number. Therefore, a creation of the first directory list 28*a* shown in FIG. 8 or FIG. 9 is completed. After completion of the process in the step S69, the process is restored to a hierarchal upper level of a routine.

Figure 16:
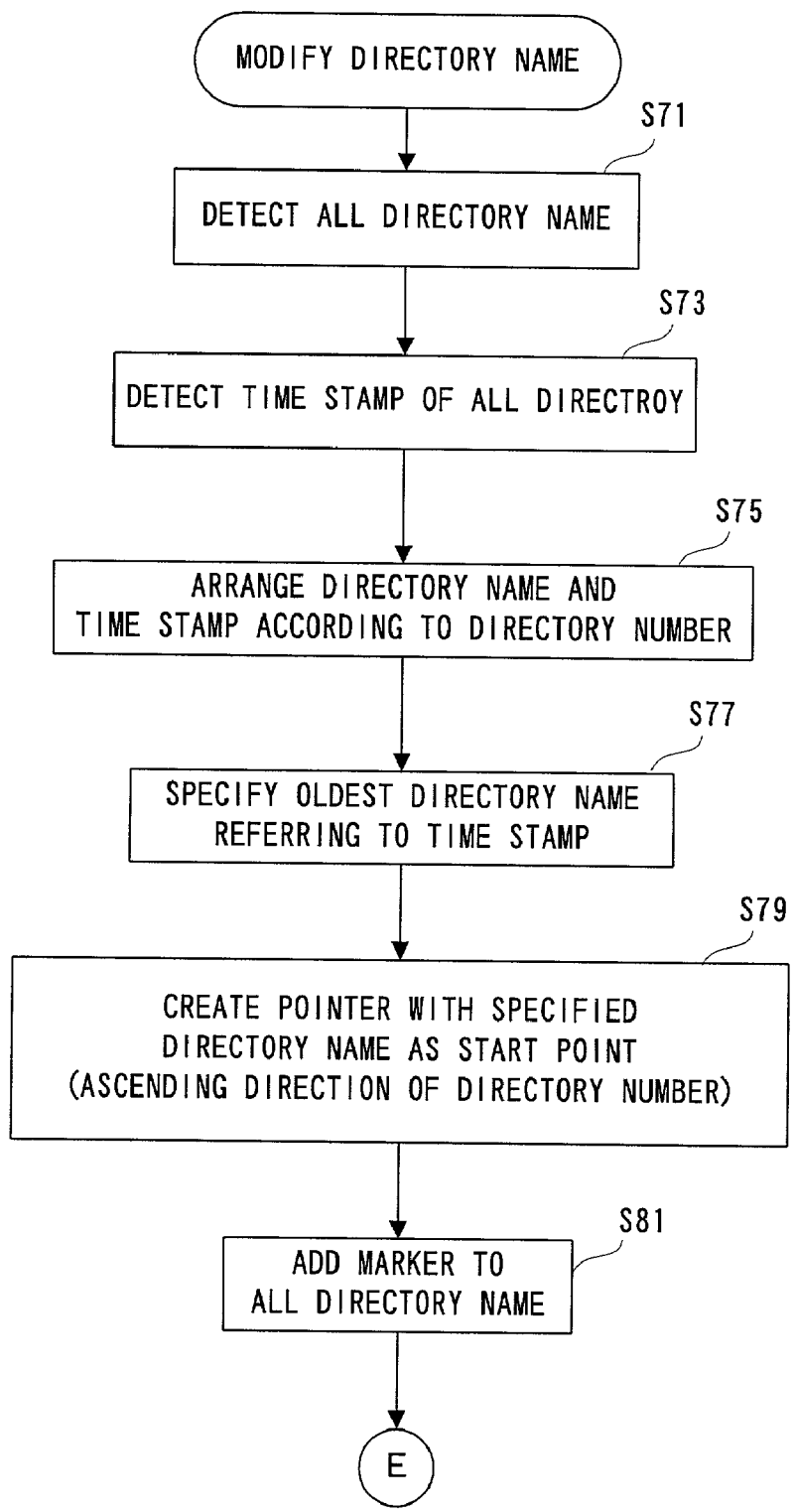
FIG. 16 is a flowchart showing another part of the operation of FIG. 1 embodiment.
Figure 17:
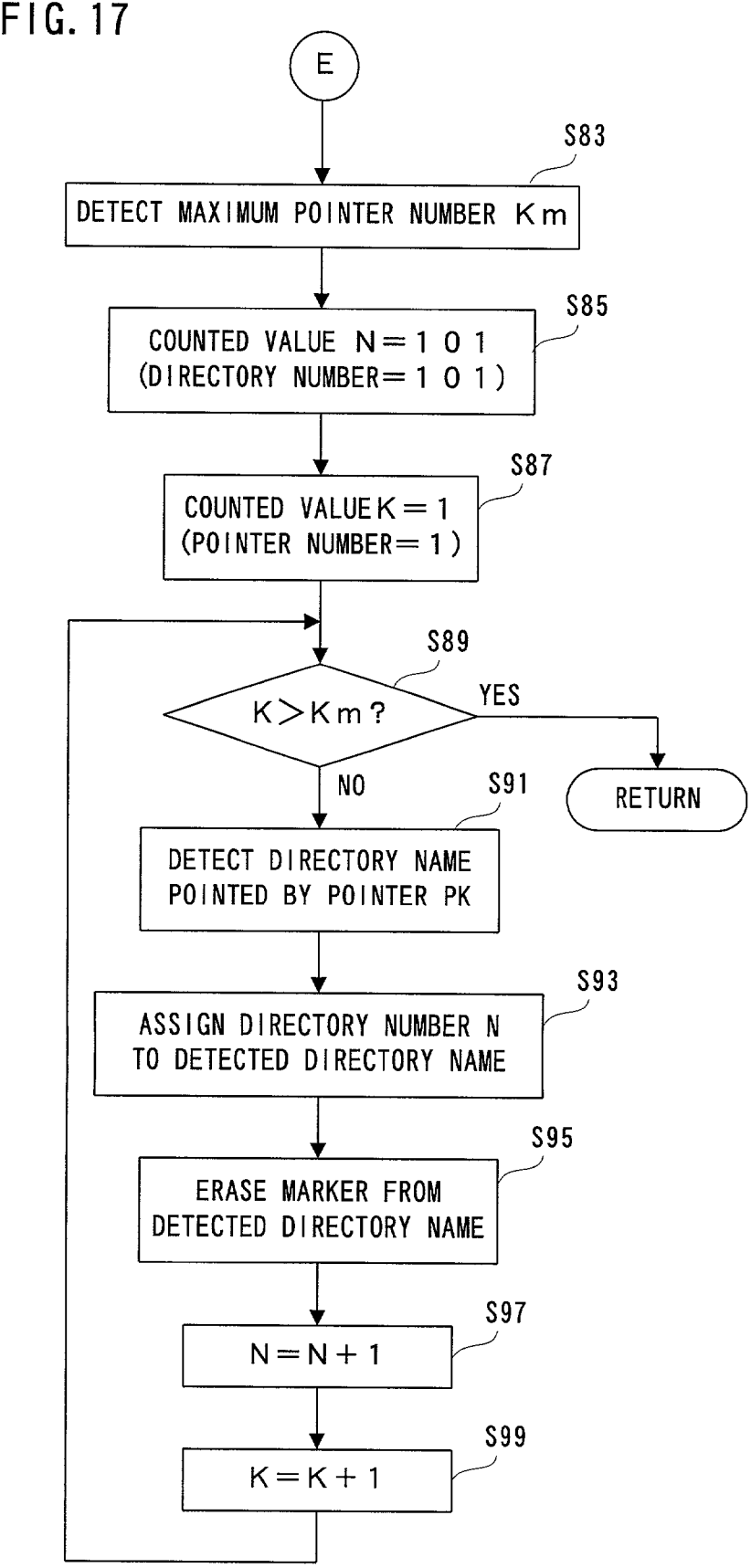
FIG. 17 is a flowchart showing the other part of the operation of FIG. 1 embodiment.

A directory name modifying process in the step S49 complies with subroutines shown in FIG. 16 and FIG. 17. First, the same process as the above-described steps S61 to S65 are performed in steps S71 to S75. The directory name of the oldest directory is specified on the basis of the time information in the step S75. The pointers P1 to PKm (Km: a total number of the directory) are respectively assigned to the directories with the specified directory name as the starting point in an ascending direction of the directory number in a following step 79. Thus, the second directory list 28*b* shown in FIG. 11(A) is created.

Succeedingly, the markers are added to the directory names in a step S81. The directory names registered in the table T2 are changed from FIG. 11(A) to FIG. 11(B), and the directory name recorded on the hard disk 20 is changed as well. A maximum pointer number Km is detected from the second directory list 28*b* in a step S83. According to FIG. 11(B), the pointer P49 pointing "149IM00" has the maximum pointer number, and Km=49 holds. A minimum directory number "101" is set as a counted value N in a step S85, and a minimum pointer number "1" is set as a counted value K in a step S87.

After completion of detecting the maximum pointer number Km and setting of the counted values N and K, the counted value K is compared with the maximum pointer number Km in a step S89. Herein, if a condition of K≦Km is satisfied, the process proceeds to a step S91, and the directory name pointed by the pointer PK is detected from the second directory list 28*b*. The directory number N is assigned to the detected directory name in a step S93, and the marker is erased from the detected directory name in a following step S95.

Accordingly, if conditions of K=1 and N=101 are satisfied, "150IM01" pointed by the pointer P1 is detected, and the directory name is modified to "101IM00". Furthermore, if conditions of K=2 and N=102 are satisfied, "101IM01" pointed by the pointer P2 is detected, and the directory name is modified to "102IM00". Such the modifying processes are executed on both of the directory names registered in the second directory list 28*b* and the directory names recorded on the hard disk 20.

After completion of the step S95, the counted values N and K are respectively incremented in steps S97 and S99 and then, the process returns to the step S89. When the processes of the steps S91 to S99 are executed times corresponding to a total number of remaining directories, the counted value K exceeds the maximum pointer number Km, and the directory name on the second directory list 28*b* complies with FIG. 11(C). At this time, "YES" is determined in the step S85, and the process is restored to the hierarchal upper level of the routine.

As understood from the above-description, the image file is stored in the directory to which the circularly successive directory number is assigned. When the number of the image files accumulated in the latest directory having the latest creation time reaches "450", the total number of the directories is determined, and if the total number is "50", the oldest directory having the oldest creation time is erased. Furthermore, when the number of the image files accumulated in the latest directory reaches "900", a new directory to which the directory number succeeding to that of the latest directory is assigned is created. Furthermore, when an arbitrary directory is erased by operating the erasing key, the directory number succeeding in the forward direction is assigned to the remaining directory in order of the creation time. That is, the directory number of the remaining directory is modified.

Accordingly, even if the number of the image files of the latest directory reaches "450" after modifying the directory number, as long as the total number of the directories is below "50", the oldest directory is not erased. Furthermore, when the number of the image files of the latest directory reaches "900" after modifying the directory number, a new directory to which the directory number succeeding to the last directory number assigned to the remaining directory is assigned is created. Thus, it is possible to effectively utilize the directory number, and it is possible to properly manage the image file.

It is noted that although only the television monitor is a separate body in this embodiment, if the surveillance camera is formed only by the image sensor and the signal processing circuit, the main body is formed by the operation panel, the CPU, the HDD and etc., and the main body and the television monitor is placed at the security guards room, it is possible to construct a large-scale surveillance camera system including a plurality of surveillance cameras, one main body and the television monitor.

Furthermore, although this embodiment is described utilizing the surveillance camera, it is needless to say that the present invention can be applied to a consumer-use digital camera.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image recording apparatus which stores an image file into a directory to which a circularly successive identification number is assigned, comprising:
   a first eraser for erasing an oldest directory when a first condition is satisfied;
   a creator for creating a new directory to which an identification number succeeding to the identification number of a latest directory is assigned when a second condition is satisfied;
   a second eraser for erasing an arbitrary directory;
   a first detector for detecting remaining directories when an erasure is performed by said second eraser;
   an assigner for assigning circularly successive identification numbers to the remaining directories in order of oldest directory to most recently created directory, respectively; and
   a second detector for detecting a second total number of the image files stored in a noted directory, wherein the first condition includes a condition that the second total number reaches a first threshold value, and the second condition includes a condition that the second total number reaches a second threshold larger than the first threshold value,
   wherein the assigner assigns the circularly successive identification numbers to each of the remaining directories.

2. An image recording apparatus according to claim 1, wherein an assignable identification number exists in a predetermined number, and the first condition includes a condition that a first total number of the directories is the predetermined number.

3. An image recording apparatus according to claim 1, wherein each directory has creation time information, and said assigner performs an assignment of the identification number on the basis of the creation time information.

4. A digital camera provided with an image recording apparatus according to claim 1.

5. A digital camera provided with an image recording apparatus according to claim 2.

6. A digital camera provided with an image recording apparatus according to claim 3.

7. An image recording apparatus, comprising:
   a setter for setting one of a plurality of identification numbers which are cyclically successive;
   a creator for creating in a recording medium a directory having the identification number set by said setter;
   a recorder for sequentially recording a plurality of images to a latest directory which exists in said recording medium during a time period from a recording start operation to a recording completion operation;
   an activator for activating said setter every time the number of images stored in the latest directory reaches a first threshold value indicative of a numerical value greater than zero;
   a first eraser for erasing an oldest directory from said recording medium when a total number of the directories which exist in said recording medium is equal to a total number of the identification numbers to be set by said setter;
   an acceptor for accepting a selecting operation to select any one of the directories existing in said recording medium during a time period from the recording completion operation to the next recording start operation;
   a second eraser for erasing from said recording medium the directory selected by the selecting operation; and
   a changer for changing respective identification numbers assigned to directories remaining in said recording medium after an erasing process by said second eraser, wherein the identification number set by said setter is in succession to an identification number assigned to the latest directory in a forward direction, and the identification numbers assigned to the remaining directories by said changer are successive in an order of oldest directory to most recently created directory, respectively,
   wherein the changer assigns the identification numbers to each of the remaining directories, and
   wherein said first eraser carries out an erasing process at a time the number of images stored in the latest directory has reached a second threshold value which is smaller than the first threshold.

8. An image recording apparatus according to claim 7, wherein the directories existing in said recording medium have creation time information, and said changer carries out an assigning process of the identification number based on the creation time information.

9. An image recording apparatus according to claim 7, wherein the directories existing in said recording medium have creation time information, and said changer carries out an assigning process of the identification number based on the creation time information.

10. A digital camera provided with an image recording apparatus according to claim 7.

11. A digital camera provided with an image recording apparatus according to claim 7.

12. A digital camera provided with an image recording apparatus according to claim 8.

13. A digital camera provided with an image recording apparatus according to claim 9.

14. A image recording apparatus as recited in claim 1, wherein the arbitrary directory erased by the second eraser is not the oldest directory.

15. An image recording apparatus as recited in claim 7, wherein the directory selected by the selecting operation is not the oldest directory.

* * * * *